US007938434B2

(12) United States Patent
Smith

(10) Patent No.: US 7,938,434 B2
(45) Date of Patent: May 10, 2011

(54) FOLDABLE WHEELCHAIR FRAME

(76) Inventor: Joel N. Smith, Edmonds, WA (US)

( * ) Notice: Subject to any disclaimer, the term of this patent is extended or adjusted under 35 U.S.C. 154(b) by 180 days.

(21) Appl. No.: 12/244,691

(22) Filed: Oct. 2, 2008

(65) Prior Publication Data

US 2009/0194974 A1 Aug. 6, 2009

Related U.S. Application Data

(63) Continuation of application No. 11/760,625, filed on Jun. 8, 2007, now abandoned.

(60) Provisional application No. 60/812,582, filed on Jun. 8, 2006.

(51) Int. Cl.
*B62M 1/14* (2006.01)
*B62B 7/06* (2006.01)

(52) U.S. Cl. .................. 280/647; 280/250.1; 280/304.1; 280/650

(58) Field of Classification Search .................. 280/642, 280/647, 650, 250.1, 304.1, 42, 644
See application file for complete search history.

(56) References Cited

U.S. PATENT DOCUMENTS

| | | | | | |
|---|---|---|---|---|---|
| 2,379,566 | A | | 7/1945 | Duke | |
| 3,405,954 | A | * | 10/1968 | Wolfe | 280/304.1 |
| 3,666,292 | A | * | 5/1972 | Bartos | 280/234 |
| 3,937,490 | A | * | 2/1976 | Nasr | 280/250.1 |
| 4,025,088 | A | * | 5/1977 | Rothschild | 280/644 |
| 4,042,250 | A | * | 8/1977 | Rodaway | 280/42 |
| 4,045,051 | A | * | 8/1977 | Igarashi et al. | 280/644 |
| 4,082,348 | A | * | 4/1978 | Haury | 297/45 |
| 4,101,143 | A | * | 7/1978 | Sieber | 280/42 |
| 4,164,354 | A | * | 8/1979 | Rodaway | 280/42 |
| 4,273,350 | A | | 6/1981 | Williams | |
| 4,360,213 | A | * | 11/1982 | Rudwick et al. | 280/250.1 |
| 4,462,604 | A | * | 7/1984 | Meyer | 280/250.1 |
| 4,493,488 | A | * | 1/1985 | Panaia et al. | 280/42 |
| 4,518,002 | A | * | 5/1985 | Battiston et al. | 135/67 |
| 4,555,121 | A | * | 11/1985 | Lockard et al. | 280/30 |
| 4,595,212 | A | * | 6/1986 | Haury et al. | 280/250.1 |
| 4,813,693 | A | * | 3/1989 | Lockard et al. | 280/42 |
| 4,863,181 | A | | 9/1989 | Howle | |
| 5,020,816 | A | * | 6/1991 | Mulholland | 280/250.1 |
| 5,306,035 | A | * | 4/1994 | Counts | 280/250.1 |
| 5,328,183 | A | | 7/1994 | Counts | |
| 5,497,926 | A | * | 3/1996 | Rittenhouse | 224/407 |
| 5,564,786 | A | * | 10/1996 | Peek et al. | 297/452.4 |
| 5,593,173 | A | | 1/1997 | Williamson | |
| 6,336,649 | B1 | * | 1/2002 | Lin | 280/278 |
| 6,390,426 | B1 | * | 5/2002 | Berry | 248/230.1 |
| 6,572,133 | B1 | | 6/2003 | Stevens | |

* cited by examiner

*Primary Examiner* — J. Allen Shriver, II
*Assistant Examiner* — Bridget Avery
(74) *Attorney, Agent, or Firm* — Christensen O'Connor Johnson Kindness PLLC

(57) ABSTRACT

A wheelchair that upon folding can become more compact for transporting and storage by enabling the vertical side frames of the wheelchair to move towards each other through the use of a sliding mechanism.

16 Claims, 6 Drawing Sheets

FOLDABLE WHEELCHAIR FRAME

CROSS-REFERENCE TO RELATED APPLICATION

This application is a continuation of patent application Ser. No. 11/760,625, filed on Jun. 8, 2007, which claims the benefit of Provisional Application No. 60/812,582, filed Jun. 8, 2006, the disclosure of which is hereby expressly incorporated by reference.

BACKGROUND

A wheelchair with the ability to become narrower for transportation and storage has several benefits. It allows the wheelchair to fit into a vehicle easier without the need to remove components, such as wheels. It takes less room to store when not in use. When folded it will fit through narrow passageways. However, traditional folding wheelchairs suffer from several problems.

As non-limiting examples, a typical folding wheelchair with an X-frame style frame, as can be seen in U.S. Pat. Nos. 2,379,566 and 5,328,183, folds very compactly but at the expense of functionality and durability. Other designs fold the frame vertically, as can be seen in U.S. Pat. No. 5,593,173, or laterally, as can be seen in U.S. Pat. Nos. 4,863,181; 6,572,133 and 4,595,212. All of the folding methods require many additional components adding substantial weight and complexity. The added weight makes it much more difficult to self propel and to lift into a vehicle for transport. Due to the many joints and pivots, they also have reduced durability for daily use requiring frequent maintenance. The additional components also increase the cost of manufacture.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A foldable frame for a wheelchair is provided. The foldable frame includes first and second side frames and a frame structure connecting the first side frame to the second side frame. The frame structure permitting the first side frame and the second frame to selectively move toward each other and away from each other.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

The foregoing aspects and many of the attendant advantages of this invention will become better understood by reference to the following detailed description, when taken in conjunction with the accompanying drawings, wherein.

DETAILED DESCRIPTION

Figure 1:
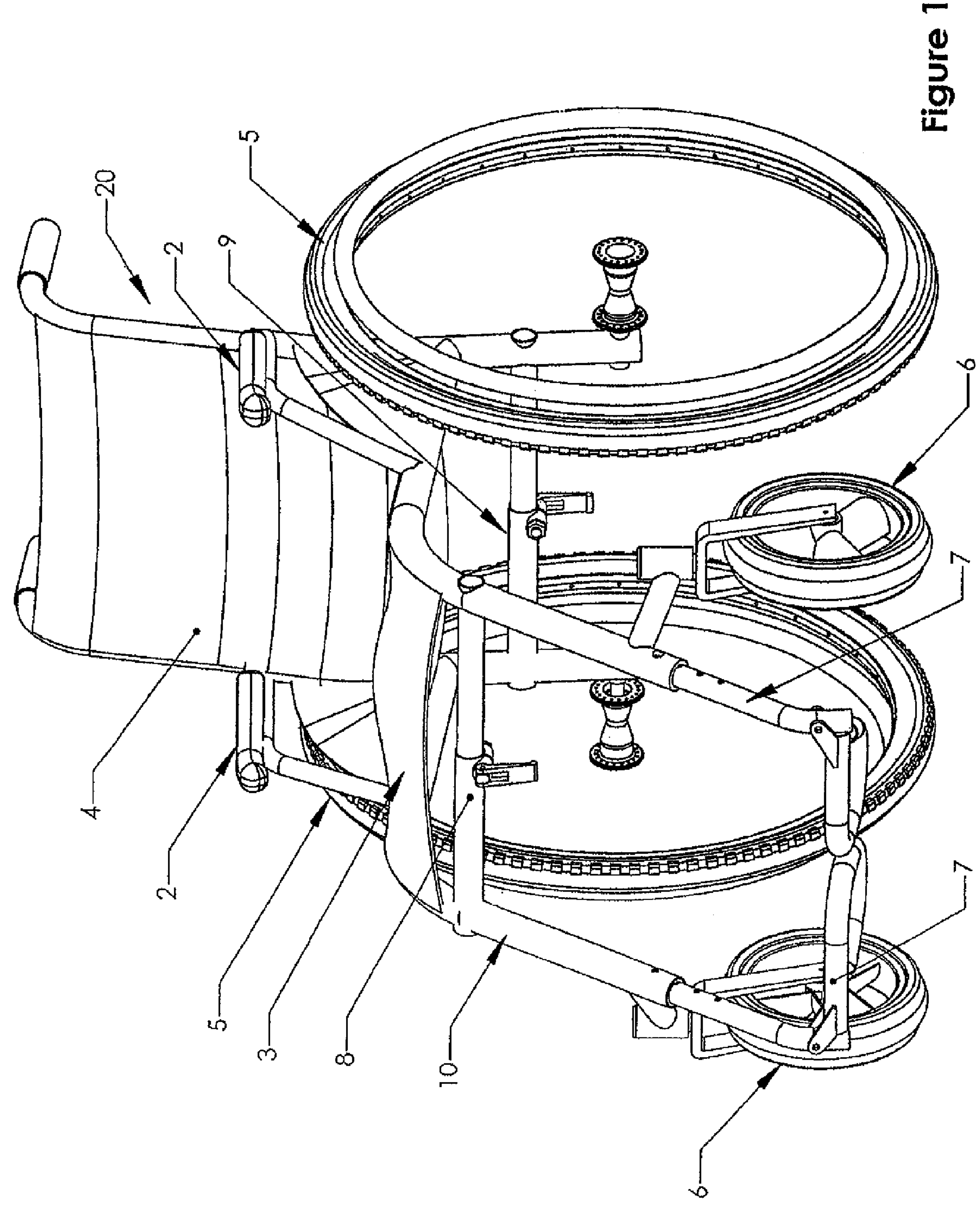
FIG. 1 is an isometric view of the complete wheelchair formed in accordance with one embodiment of the present disclosure.

A foldable wheelchair constructed, in accordance with one embodiment of the present disclosure, may be best understood by referring to FIGS. 1-10. The foldable wheelchair includes a set of large rear wheels 5, a set of front smaller wheels or casters 6. The wheels are connected to two generally vertical side frames 10, 20 between which extends interconnecting frame structures 8 connecting the forward ends of the side frames 10, 20 and 9 connecting the aft ends of the side frames 10, 20. The seating and backrest fabric 3 and 4 respectively are attached to the side frames. Footrest assemblies 7 are inserted into the side frames 10, 20 and can be fixed at a variety of heights depending on the size of the user.

Figure 2:
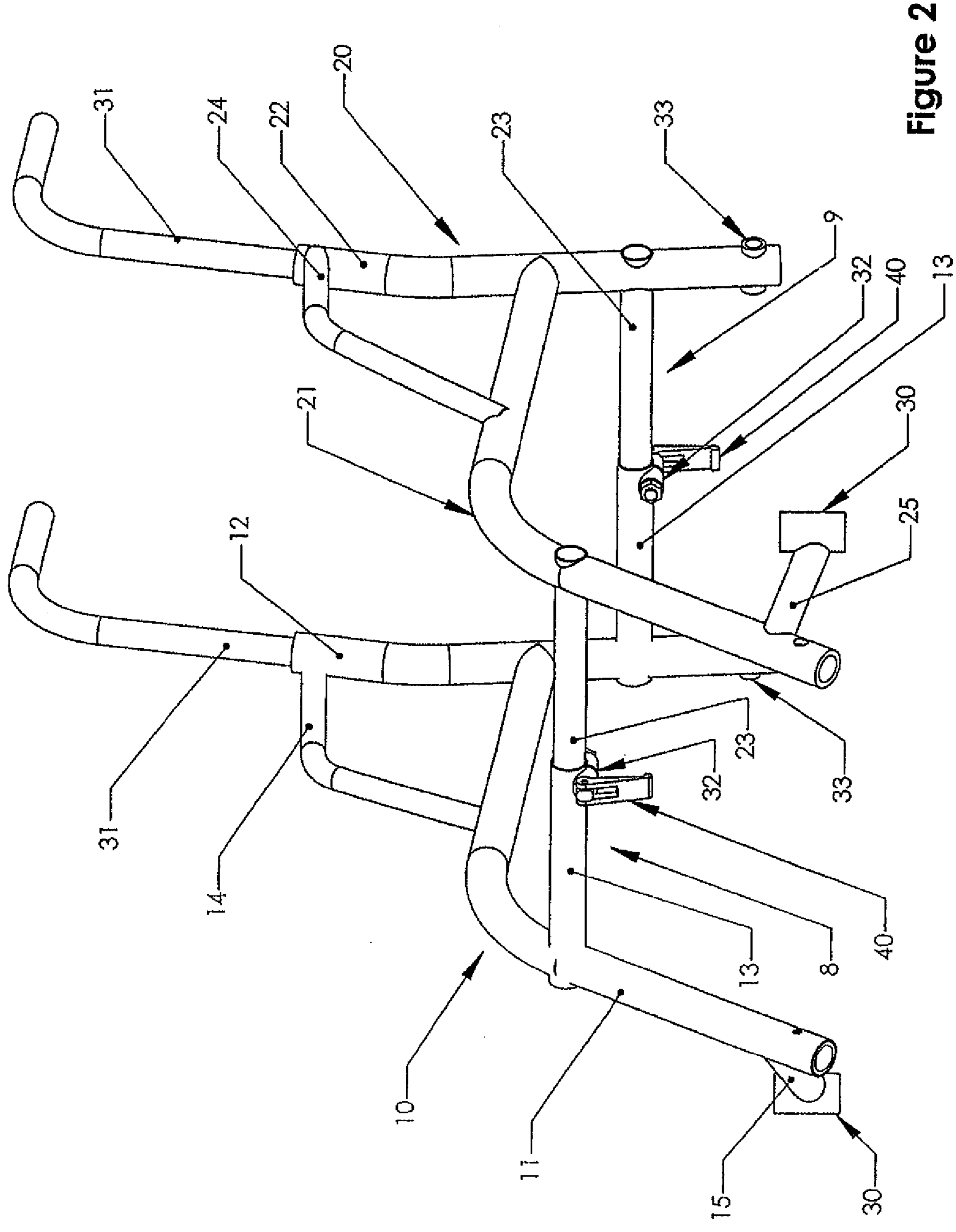
FIG. 2 is an isometric view of the wheelchair frame.

As may be best seen by referring to FIG. 2, the interconnecting structures include sliding joints. In its preferred form, it would include two telescopic cross tubes. The telescopic tubes include an outer sleeve tube 13 fixed to side frame 10 and a slidable inner sleeve tube 23 fixed to side frame 20. When the side frames 10 and 20 are pulled away from one another such that the seating and backrest fabric 3, 4 are pulled tight, the inner and outer tubes can be locked together to form a rigid frame in the open position with the use of a locking mechanism 40.

Figure 3:
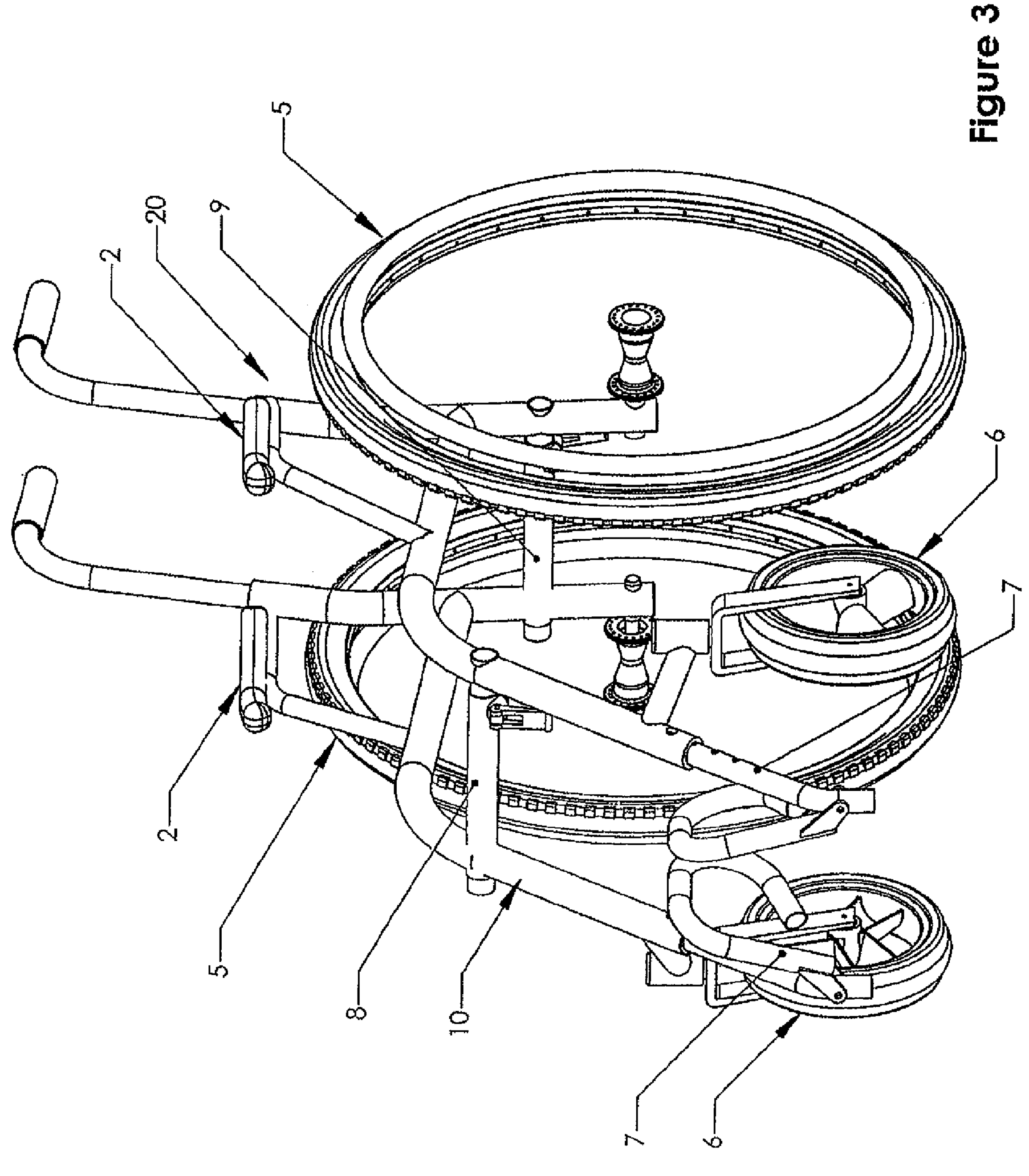
FIG. 3 is an isometric view of the complete wheelchair in its folded position with the seat fabric removed for clarity.
Figure 4:
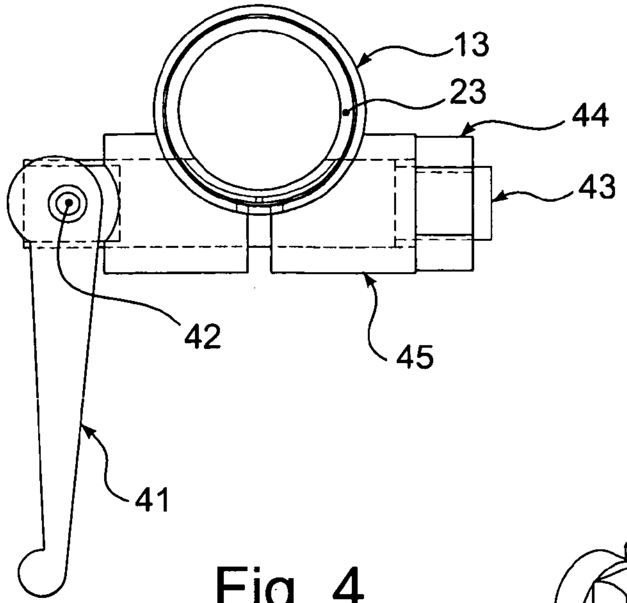
FIG. 4 is a detail side view of the barrel lock assembly in its unlocked or open position.
Figure 5:
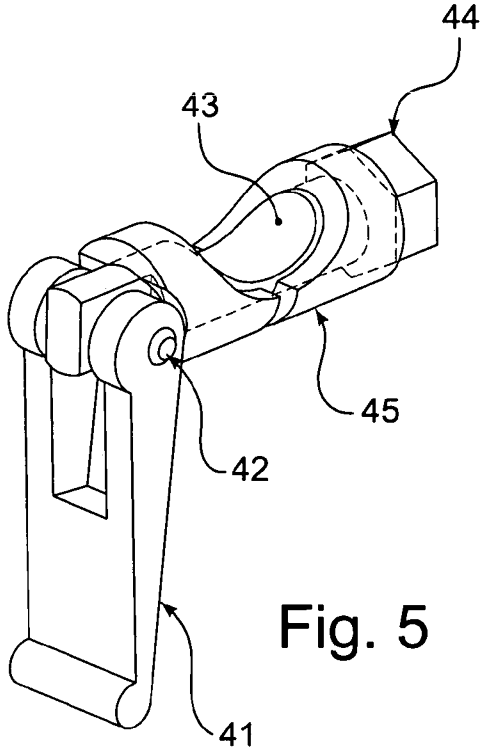
FIG. 5 is a detail isometric view of the barrel lock mechanism in its unlocked or open position.
Figure 6:
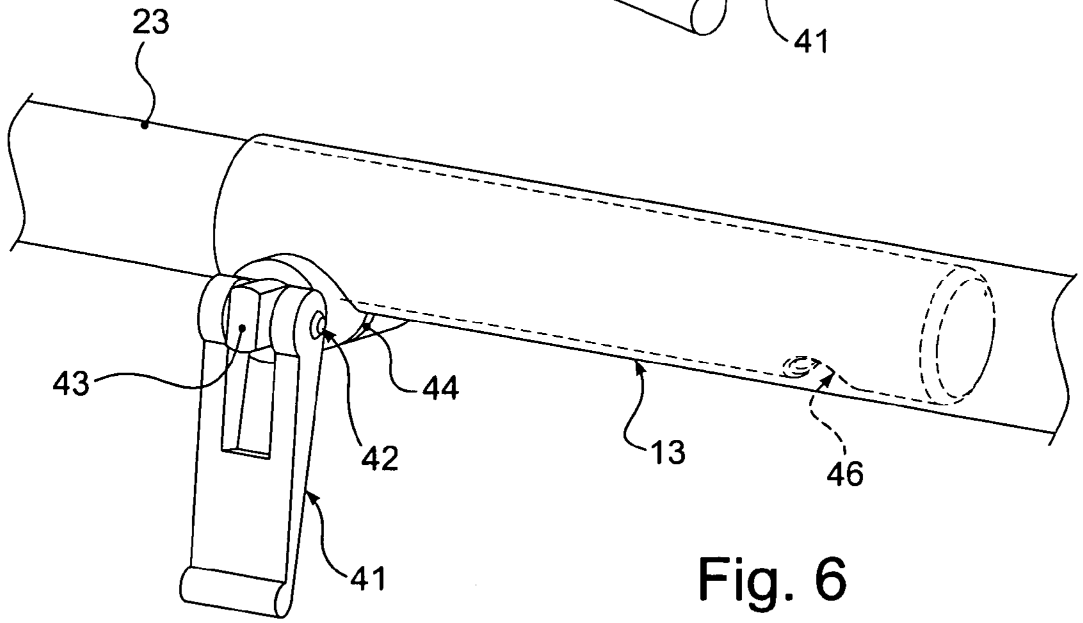
FIG. 6 is a detail isometric view of the barrel lock assembly in its unlocked or open position.
Figure 7:
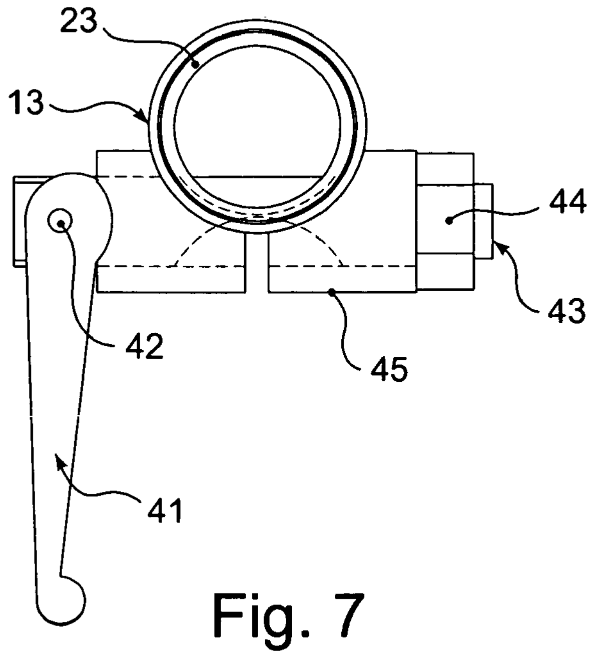
FIG. 7 is a detail side view of the barrel lock assembly in its locked position.
Figure 8:
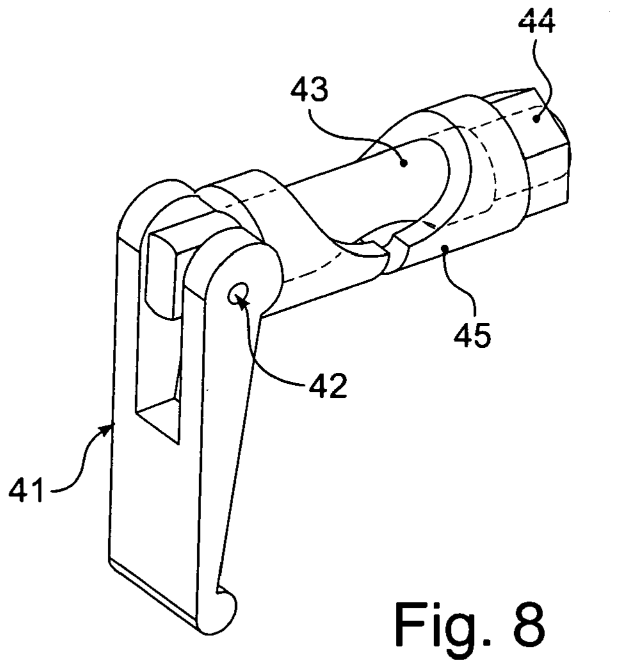
FIG. 8 is a detail isometric view of the barrel lock mechanism in its locked position.
Figure 9:
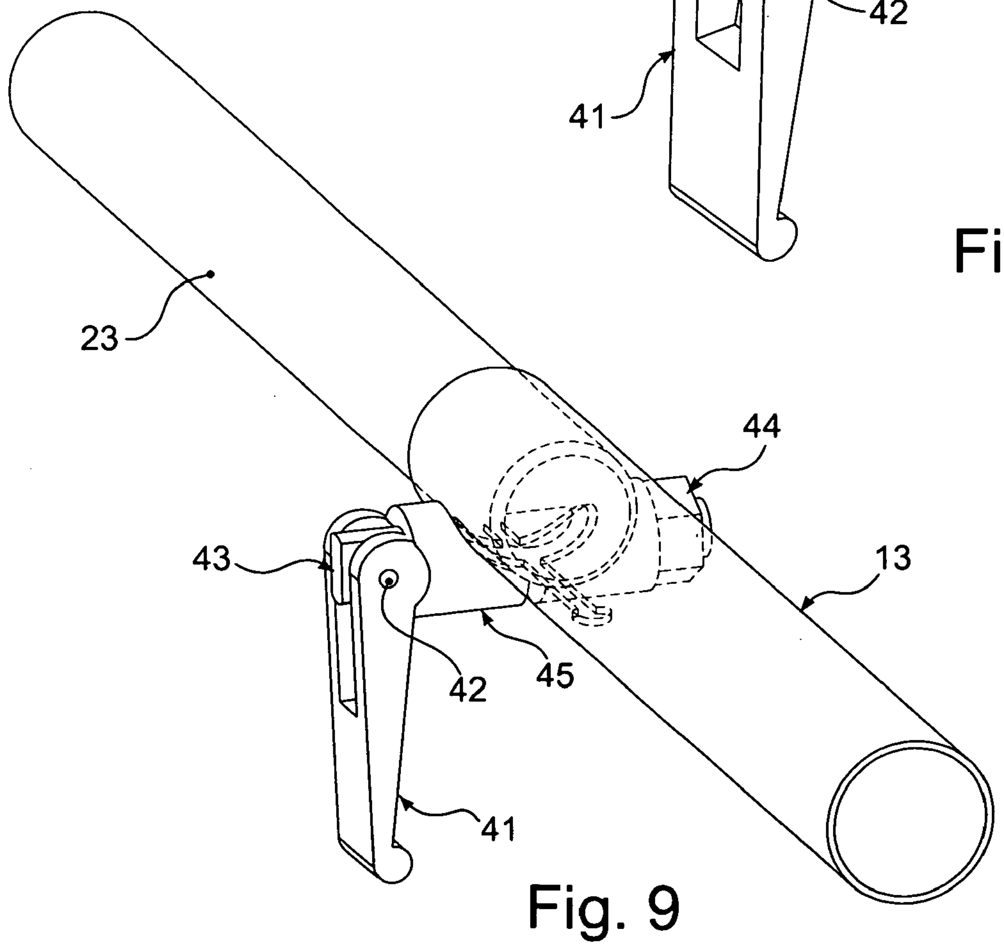
FIG. 9 is a detail isometric view of the barrel lock assembly in its locked position.
Figure 10:
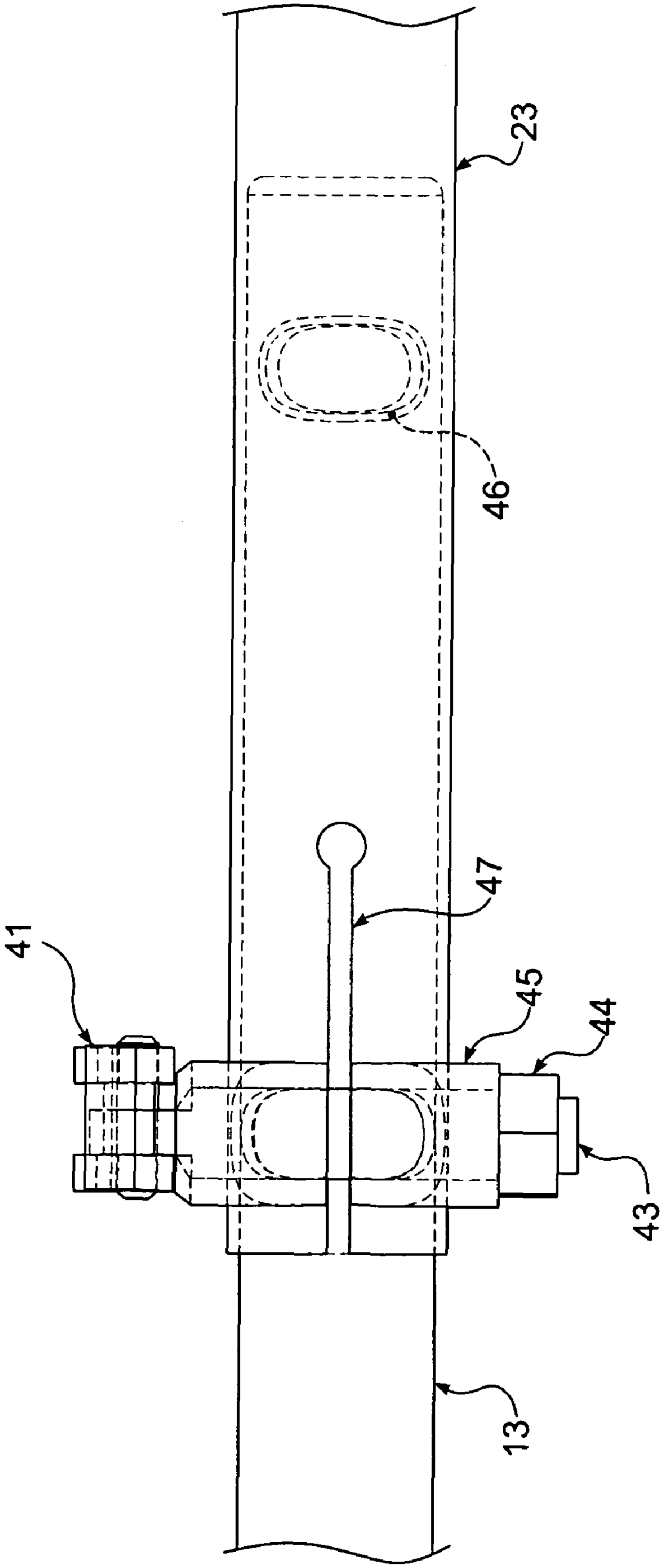
FIG. 10 is a detail bottom view of the barrel lock assembly in it's unlocked position.

Referring to FIGS. 2-3, when the locking mechanism 40 is in its unlocked position the side frames 10, 20 can slide toward each other which slides the inner sleeve tube 23 further inside the outer sleeve tube 13 until the outer sleeve tube 13 touches the side frame 20 which represents the wheelchair in its folded position.

As may best be seen by referring to FIGS. 1-2, side frames 10 and 20 are substantially mirror images of each other and will be described together with the few exceptions highlighted. The side frame components are made from hollow structural steel tubing. The side frames are composed of side rails 11, 21 which support the mostly horizontally positioned seat fabric 3 and are then bent downward near their midpoint to align with the footrest assembly 7. Near the forward ends of the side frames 11, 21 the castor connects tubes 15, 25 are welded to both the side rails 11, 21 and the vertically oriented castor tubes 30. The mostly vertical backrest support frames 12, 22 are welded to the aft end of side rails 11, 21. Additionally, the backrest support frames have the substantially horizontal axle mount tubes 33, passing through them and welded near their lower ends. The axle bolts of the rear wheels 5 pass through the axle mounts 33 and are locked in place. The backrest canes 31 slide into the upper end of the backrest support frames 12, 22 and are locked into position. The armrest support tubes 14, 24 are welded at their aft ends to the backrest support frames 12, 22 they follow a substantially horizontal position on which the armrests 2 are bolted, they then bend downward near their midpoint and continue to the side rails 11, 21 where they are welded.

The interconnecting tube assemblies include the two outer sleeve tubes 13. The forward tube passes through and is welded to side frame 11 and the second passes through and is welded to backrest support tube 12. Additionally, there are two inner sleeve tubes 23. The forward inner sleeve tube 23 passes through and is welded to side frame 21 and the second passes through and is welded to backrest support tube 22. The inner sleeve tube is of proper outside diameter to fit inside the outer sleeve tube 13 with sufficient clearance to not bind up, but similar enough to allow the outer sleeve tube 13 to be securely clamped around it using clamping assembly 40.

As may be best seen by referring to FIG. 4-10, the clamping assembly 40 includes the binding tube 45 which is oriented perpendicular the outer sleeve tube 13 and mitered to match the outer diameter of outer sleeve tube 13 and then welded to the under side of it near its end, the barrel lock bolt 43 which passes through the binding tube 45 and adjustment nut 44 which is threaded onto the barrel lock bolt 43. The cam lock lever 41 is attached to the barrel lock bolt with the cam pin 42. The barrel lock bolt 43 is mitered near its mid section to match the outer diameter of the inner sleeve tube 23. This allows the inner sleeve tube 23 to pass through the binding tube 45 and barrel lock bolt 43 without interference. Near the end of the inner sleeve tube 23 there is an inner sleeve tube miter 46 oriented perpendicular to its length and the same diameter as the barrel lock bolt 43. The inner sleeve tube miter 46 is located such that when lined up with binding tube 45, a bolt the diameter of the barrel lock bolt 43 could pass through the inner sleeve tube 23 without interference.

The clamping assembly works in two ways to lock the inner sleeve tube 23 to the outer sleeve tube 13 when the wheelchair is in its open position. The first way the inner and outer sleeve tubes 23, 13 are locked together is with a barrel lock. The barrel lock has an open and a locked position. When the barrel lock is in the open position (FIGS. 4-6) the barrel lock bolt 43 is rotated so its mitered section matches the contour of the inner sleeve tube 23, thus allowing it to pass through the barrel lock bolt 43. To place the barrel lock in its locked position (FIGS. 7-9) the inner sleeve tube miter 46 is lined up with binding tube 45 and the barrel lock bolt 43 is rotated one hundred eighty degrees, moving its unmitered side into the inner sleeve tube miter 46, thus preventing the inner sleeve tube 23 from sliding in or out of outer sleeve tube 13 or rotating relative to outer sleeve tube 13.

Referring to FIGS. 4-10, the second clamping mechanism includes a cam lock. The cam lock utilizes several additional features built into the binding tube 45, cam lever 41, adjustment nut 44 and outer sleeve tube 13. A miter that matches the shape of the cam lever profile when the cam lever 41 is substantially vertically oriented is cut into the end of binding tube 45. The hole that allows the cam pin 42 to pass through cam lever 41 is slightly offset horizontally relative to the location of the center of the cam lever profile when the cam lever 41 is positioned substantially vertical. Additionally, a slot 47 (FIG. 10) has been cut through the underside the outer sleeve tube 13 and the binding tube 45. The cam lock has an open and locked position. In the open position (FIGS. 4-6) the cam lever 41 is oriented such that cam lever profile edge with the shortest distance relative to cam pin 42 is along the side of the mitered profile of the binding tube 45. To place the cam lock in its locked position (FIGS. 7-10) the cam lever 41 is rotated approximately 180 degrees about the cam pin 42. When the cam lever 41 is rotated, the cam lever profile edge will be the longest distance relative to the cam pin 42 is moved along the side of the mitered profile of the binding tube 45 thus pulling the barrel lock bolt 43 and adjustment nut 44 in the direction of the cam lever 41. As the barrel lock bolt 43 and adjustment nut 44 are pulled toward the cam lever 41 the adjustment nut pushes against the unmitered end of the binding tube 45 and the cam lever 41 pushes against the mitered end of binding tube 45 partially collapsing the slot 47 and compressing the outer sleeve tube 13 onto the inner sleeve tube 23. With the addition of the cam lock, any space between the inside of the outer sleeve tube 13 and inner sleeve tube 23 is removed providing a firmly locked joint when used in combination with the barrel lock.

A foldable wheelchair of the present disclosure includes a set of large rear wheels, a set of front smaller wheels or casters. The wheels are connected to two generally vertical side frames between which extends interconnecting frame structures connecting the two side frames together. The interconnecting frame structures connect the first side frame to the second side frame in a manner permitting the first frame member and the second frame member to be selectively moved toward and away from each other, thereby, permitting the collapse of the wheelchair for storage or transport. The interconnecting structure includes a sliding joint. In its preferred form, it would have two telescopic cross tubes. One telescopic tube connects the forward end of the side frames and the second connects the aft end of the side frames. The telescopic tubes include an outer tube fixed to one side frame and a slidable inner tube fixed to the other side frame. The inner and outer tubes can be locked together to form a rigid frame. The locking mechanism can be readily changed from the locked open wheelchair position to an unlocked position that allows the wheelchair to be folded.

The sliding interconnecting structure provides a robust and simple folding mechanism. With fewer components and no pivoting joints the system provides a durable, lightweight and lower cost folding system.

While illustrative embodiments have been illustrated and described, it will be appreciated that various changes can be made therein without departing from the spirit and scope of the invention.

The embodiments of the invention in which an exclusive property or privilege is claimed are defined as follows:

1. A foldable frame for a wheelchair, comprising:

(a) first and second side frames;

(b) at least one interconnecting frame structure connecting the first side frame to the second side frame, the at least one interconnecting frame structure comprising an inner tube slidably receivable within an outer tube, permitting the first side frame and the second side frame to selectively move toward each other and away from each other to reciprocate the foldable frame between at least open and closed positions; and (c) a locking mechanism operably coupled to the at least one interconnecting frame structure, the locking mechanism comprising:

(i) a housing secured to the outer tube and a slot that extends along at least a portion of the housing and the outer tube; and (ii) a bolt moveably secured within the housing and lockingly engageable with the inner tube when the foldable frame is in the open position.

2. The foldable frame of claim 1, wherein the housing and the bolt include corresponding recesses sized and configured to slidably receive a portion of the inner tube when the recess of the bolt is substantially aligned with the recess of the housing.

3. The foldable frame of claim 1, wherein the locking mechanism further comprises a recess in the inner tube that is sized and configured to receive a portion of the bolt when the foldable frame is in the open position.

4. The foldable frame of claim 1, further comprising a cam mechanism configured to releasably secure the inner tube within the outer tube.

5. The foldable frame of claim 1, wherein the cam mechanism is configured to draw the nut against the housing when the lever is moved into the first position to decrease the width of the slot and secure the inner tube within the outer tube.

6. The foldable frame of claim 4, wherein the cam mechanism comprises a lever pivotally secured on a first end of the bolt and selectively moveable between at least a first position, wherein the lever is lockingly engaged with the housing, and a second position, wherein the lever is disengaged from the housing.

7. The foldable frame of claim 6, further comprising a nut adjustably received on a second end of the bolt, the nut engageable with the housing.

8. A foldable frame for a wheelchair, comprising:

(a) first and second side frames;

(b) at least one interconnecting frame structure connecting the first side frame to the second side frame, the at least one interconnecting frame structure comprising an inner tube slidably receivable within an outer tube, permitting the first side frame and the second side frame to selectively move toward each other and away from each other to reciprocate the foldable frame between at least open and closed positions;

(c) a locking mechanism configured to secure the foldable frame in at least the open position, the locking mechanism comprising:

(i) a housing secured to the outer tube and a slot that extends along at least a portion of the housing and the outer tube; and (ii) a bolt moveably secured within the housing, the bolt selectively moveable between a first position, wherein the inner tube is slidable against the bolt, and a second position, wherein the inner tube is fixed relative to the bolt; and (d) a cam mechanism operably coupled to the locking mechanism and configured to releasably secure the inner tube within the outer tube.

9. The foldable frame of claim 8, wherein the housing and the bolt include corresponding recesses sized and configured to slidably receive a portion of the inner tube when the recess of the bolt is substantially aligned with the recess of the housing.

10. The foldable frame of claim 8, wherein the locking mechanism further comprises a recess in the inner tube that is sized and configured to receive a portion of the bolt when the foldable frame is in the open position.

11. The foldable frame of claim 8, wherein the cam mechanism comprises a lever pivotally secured on a first end of the bolt and selectively moveable between at least a first position, wherein the lever is lockingly engaged with the housing, and a second position, wherein the lever is disengaged from the housing.

12. The foldable frame of claim 8, wherein the cam mechanism is configured to draw the nut against the housing when the lever is moved into the first position to decrease the width of the slot and secure the inner tube within the outer tube.

13. The foldable frame of claim 11, further comprising a nut adjustably received on a second end of the bolt, the nut engageable with the housing.

14. A foldable frame for a wheelchair, comprising:

(a) first and second side frames;

(b) at least one interconnecting frame structure connecting the first side frame to the second side frame, the at least one interconnecting frame structure comprising an inner tube slidably receivable within an outer tube, permitting the first side frame and the second side frame to selectively move toward each other and away from each other to reciprocate the foldable frame between at least open and closed positions;

(c) a locking mechanism comprising a housing secured to the outer tube and a bolt moveably secured within the housing, the bolt selectively moveable between a first bolt position, wherein the bolt fixedly engages the inner tube, and a second bolt position, wherein the bolt slidably receives the inner tube;

(d) a cam mechanism having a lever pivotally secured on a first end of the bolt, the lever selectively engageable with the housing in a first lever position to compress the outer tube onto the inner tube; and (e) a nut adjustably received on a second end of the bolt, the nut engageable with the housing; and (f) a slot extending along at least a portion of the housing and the outer tube, wherein the lever draws the nut into engagement with the housing when the lever is moved into the first lever position to decrease the width of the slot and secure the inner tube within the outer tube.

15. The foldable frame of claim 14, wherein the housing and the bolt include corresponding recesses sized and configured to slidably receive a portion of the inner tube when the recess of the bolt is substantially aligned with the recess of the housing.

16. The foldable frame of claim 14, wherein the locking mechanism further comprises a recess in the inner tube that is sized and configured to receive a portion of the bolt when the foldable frame is in the open position.

* * * * *